(12) United States Patent
Kim

(10) Patent No.: US 7,844,394 B2
(45) Date of Patent: Nov. 30, 2010

(54) TURN-BY-TURN NAVIGATION SYSTEM AND NEXT DIRECTION GUIDANCE METHOD USING THE SAME

(75) Inventor: Hee Jeong Kim, Seoul (KR)

(73) Assignee: LG Electronics, Inc., Seoul (KR)

( * ) Notice: Subject to any disclaimer, the term of this patent is extended or adjusted under 35 U.S.C. 154(b) by 1150 days.

(21) Appl. No.: 10/892,885

(22) Filed: Jul. 16, 2004

(65) Prior Publication Data

US 2005/0027444 A1 Feb. 3, 2005

(30) Foreign Application Priority Data

Jul. 18, 2003 (KR) .................. 10-2003-0049339

(51) Int. Cl.
*G01C 21/00* (2006.01)
*G08G 1/123* (2006.01)
*G01C 21/30* (2006.01)
*G01C 21/32* (2006.01)

(52) U.S. Cl. ............... 701/201; 340/995.2; 340/995.27; 701/207; 701/210; 701/211

(58) Field of Classification Search ............ 340/995.17, 340/995.14, 995.2, 995.27; 701/206
See application file for complete search history.

(56) References Cited

U.S. PATENT DOCUMENTS

| | | | | |
|---|---|---|---|---|
| 5,544,060 A | * | 8/1996 | Fujii et al. ............ | 701/201 |
| 5,874,905 A | * | 2/1999 | Nanba et al. .......... | 340/995.2 |
| 6,061,628 A | * | 5/2000 | Hayashi et al. ........ | 701/208 |
| 6,693,564 B2 | * | 2/2004 | Niitsuma ............... | 340/995.2 |
| 6,700,505 B2 | * | 3/2004 | Yamashita et al. ..... | 340/988 |
| 2001/0013837 A1 | | 8/2001 | Yamashita et al. | |
| 2002/0040271 A1 | | 4/2002 | Park et al. | |
| 2003/0078728 A1 | | 4/2003 | Engelsberg et al. | |
| 2004/0204845 A1 | * | 10/2004 | Wong ..................... | 701/210 |

FOREIGN PATENT DOCUMENTS

EP     0 762 360 A1    3/1997

\* cited by examiner

*Primary Examiner*—Khoi Tran
*Assistant Examiner*—Nicholas Kiswanto
(74) *Attorney, Agent, or Firm*—Lee, Hong, Degerman, Kang & Waimey

(57) ABSTRACT

A turn-by-turn navigation system includes a positioning module receiving position information and updating real time road information on a road where a car is currently located, a map database storing map information required for driving the car, a route planning/route guidance module receiving the real time road information and the map information and generating current guidance information and next guidance information, a turn-by-turn graphic user interface module receiving the current and next guidance information and generating current and next guidance images, and an image display unit displaying the current and next guidance images.

39 Claims, 5 Drawing Sheets

TURN-BY-TURN NAVIGATION SYSTEM AND NEXT DIRECTION GUIDANCE METHOD USING THE SAME

CROSS-REFERENCE TO RELATED APPLICATIONS

Pursuant to 35 U.S.C. §119(a), this application claims the benefit of earlier filing date and right of priority to Korean Application No. 49339/2003, filed on Jul. 18, 2003, the contents of which are hereby incorporated by reference herein in their entirety.

BACKGROUND OF THE INVENTION

1. Field of the Invention

The present invention relates to a car navigation system.

2. Description of the Related Art

In recent years, a variety of car navigation systems have been developed. Such a car navigation system can be classified according to a screen guide method into a full map navigation system and a turn-by-turn navigation system. The former is designed to guide a driver to a destination by displaying a current path and location on a map, while the latter is designed to guide the driver to the destination by issuing a simple directional command such as a left turn, a right turn and a straight drive instructions considering the current location and driving direction.

As is well known, the turn-by-turn navigation system is suitable to a person who is not familiar with reading a map or to a case where a display screen is too small to display a sufficient range of the map.

FIG. 1 shows a screen example of a prior full map navigation system.

Referring to FIG. 1, the screen shows that the car successively makes a right turn, a left turn, a right turn, and a right turn to reach the destination. That is, since the full map navigation system displays a path that would give a driver a direction where the car must be advanced at a glance so that the driver can properly cope with a next path guide.

Meanwhile, the screen guide of the turn-by-turn navigation system is however designed to focus on the current point of time. FIG. 2 shows a screen example of a prior turn-by-turn navigation system.

As shown in FIGS. 2a through 2c, the turn-by-turn navigation system shows only a current directional guide to a right-turn or a left-turn. That is, the turn-by-turn navigation system has a disadvantage of not providing a next guidance of the current guidance. The system provide a next guidance after the car advances by a predetermined distance from the current position. As shown in FIGS. 2a through 2c, a predetermined distance 21 required for the direction change and direction information 22 are displayed on the screen.

When the time and distance for coping with a lane change are sufficient to perform the next guidance after following the current guidance, the driver may not get into trouble. However, when the user does not have any information on the current driving road and the distance to the next direction change point is too short for the driver to cope with the next guidance, the driver may get into trouble. This may sometimes cause a fatal accident.

SUMMARY OF THE INVENTION

Accordingly, the present invention is directed to a turn-by-turn navigation system and a next direction guiding method the same that substantially obviate one or more problems due to limitations and disadvantages of the related art.

An object of the present invention is to provide a turn-by-turn navigation system and a next direction guidance method that allow a driver to effectively cope with the next advancing direction by allowing the driver to predict a next advancing direction as well as by informing a current advancing direction.

Another object of the present invention is to provide a turn-by-turn navigation system and a next direction guidance method that can allow a driver to effectively cope with the next advancing direction by informing the driver the extent of urgency for responding to the next advancing direction.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a turn-by-turn navigation system including: a positioning module receiving position information and updating real time road information on a road where a car is currently located; a map database storing map information required for driving the car; a route planning/route guidance module receiving the real time road information and the map information and generating current guidance information and next guidance information; a turn-by-turn graphic user interface module receiving the current and next guidance information and generating current and next guidance images; and an image display unit displaying the current and next guidance images.

In another aspect of the present invention, there is provided a method for guiding a next direction using a turn-by-turn navigation system, the method comprising: inputting a destination; identifying a current car position and generating a path to the destination inputted; generating a current guidance image based on the current car position and a next guidance image; and displaying the current and next guidance images.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings.

Figure 1:
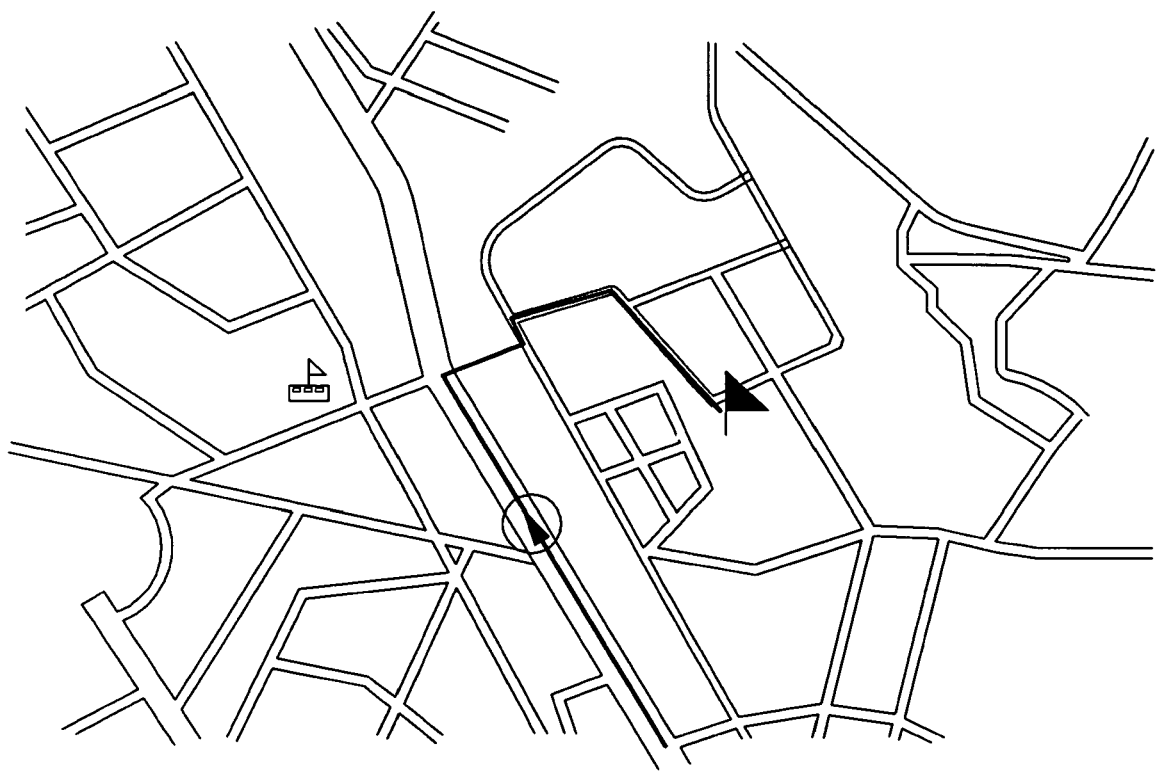
FIG. 1 is a view illustrating a screen example of a prior full map navigation system.
Figure 2:
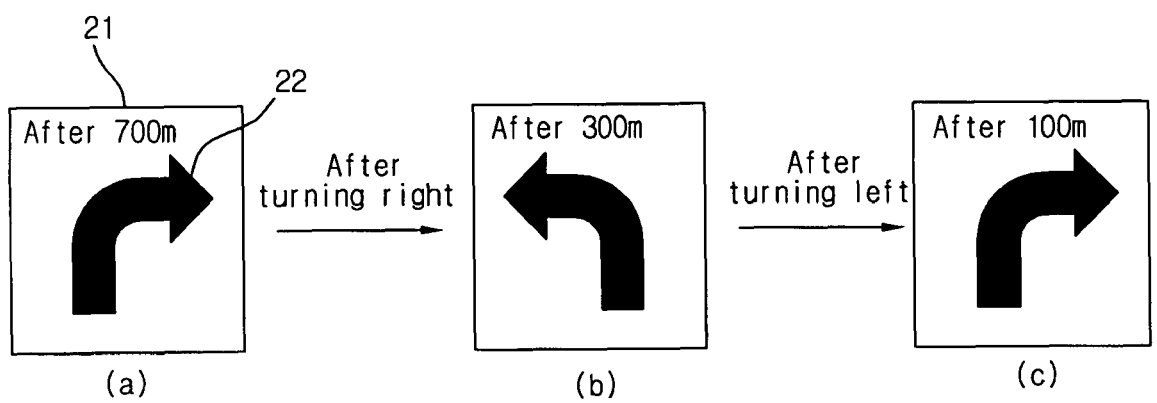
FIGS. 2a through 2c are views illustrating a screen example of a prior turn-by-turn navigation system.
Figure 3:
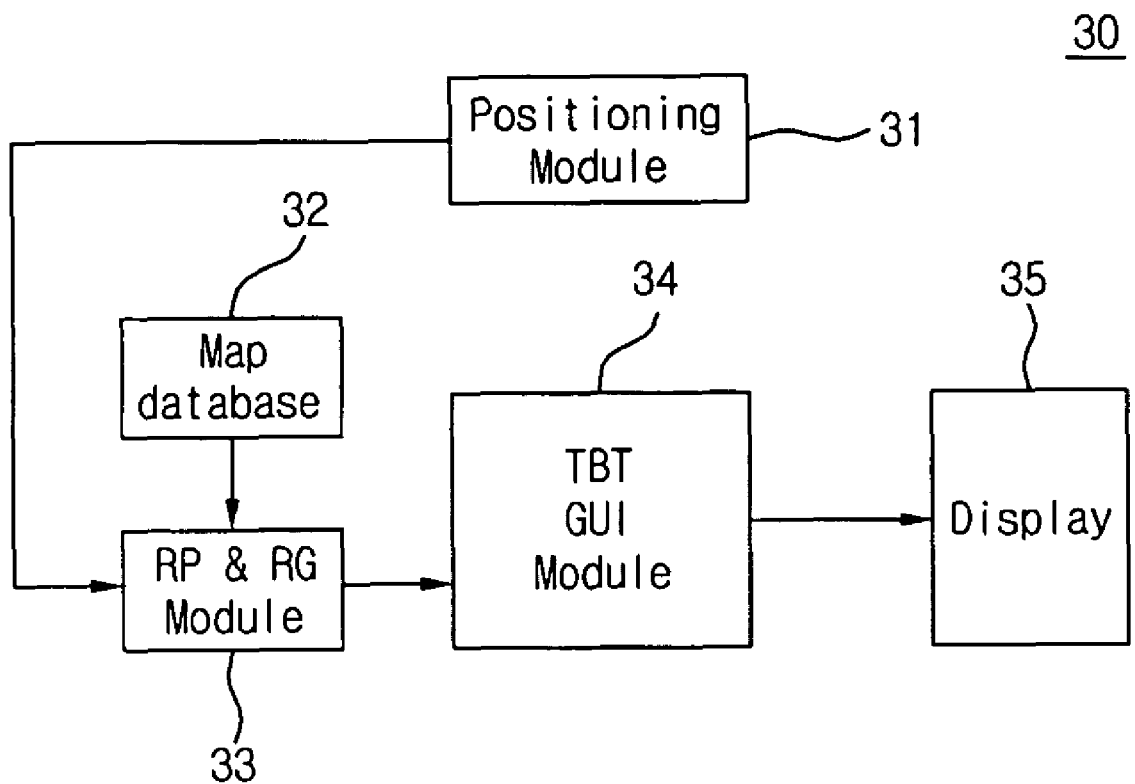
FIG. 3 is a block diagram of a turn-by-turn navigation system according to an embodiment of the present invention.

FIG. 3 shows a turn-by-turn navigation system according to an embodiment of the present invention.

Referring to FIG. 3, a turn-by-turn navigation system 30 includes a positioning module 31, a map database 32, a route planning/route guidance module 33, a turn-by-turn graphic user interface module 34, and a direction display unit 35.

The positioning module 31 functions to receive information from a satellite and update real time information on a road where a car is currently located. The map database 32 stores map information required for driving.

The route planning/route guidance module 33 functions to receive the current road information and the map information and generate current and next guidance information. The turn-by-turn graphic user interface module 34 functions to receive the current and next guidance information and generate current and next guide images. The direction display unit 35 provides the current and next guide images to the driver by displaying the same.

Figure 4:
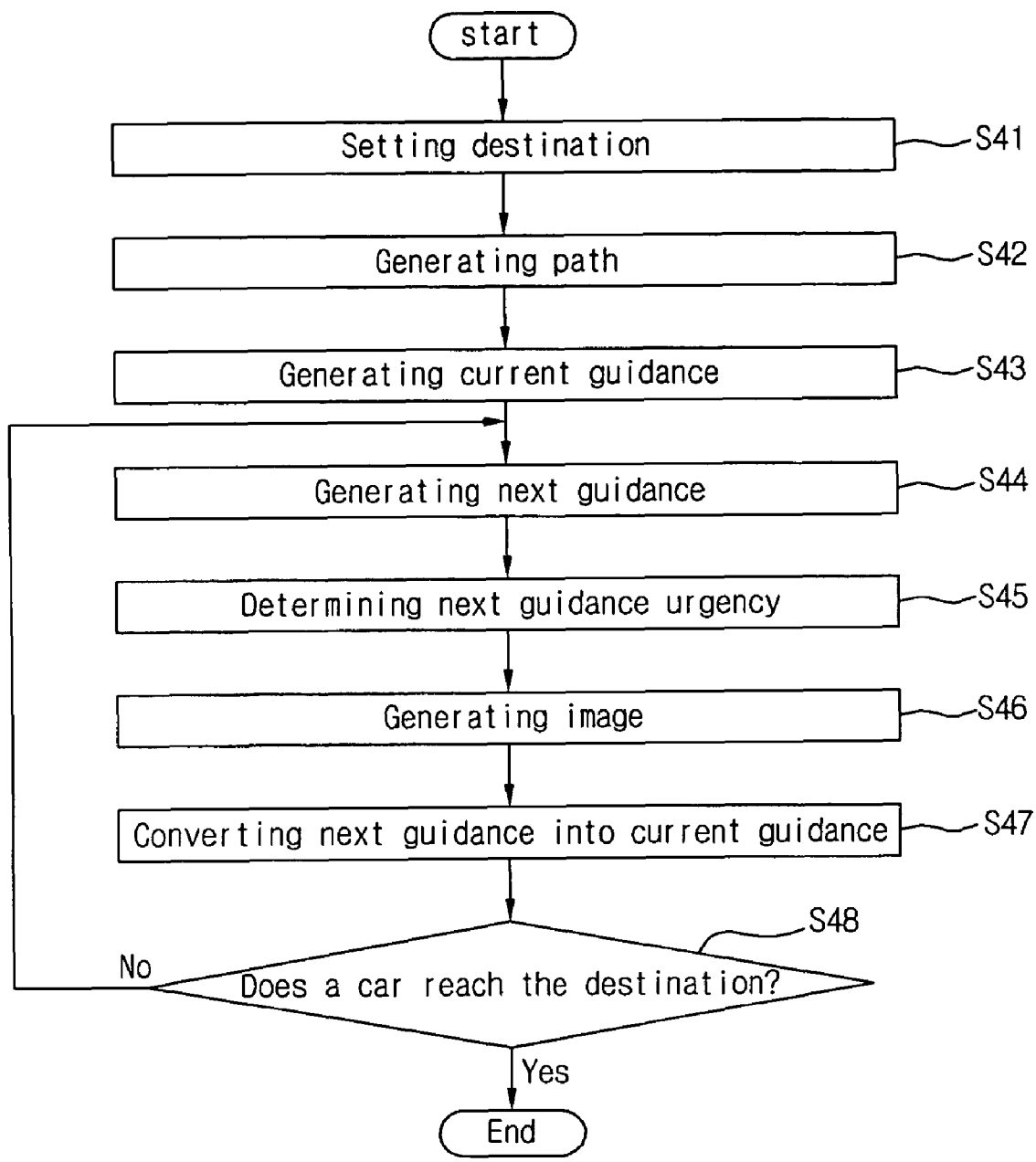
FIG. 4 is a flowchart illustrating a screen guide method of a turn-by-turn navigation system according to an embodiment of the present invention.

FIG. 4 shows a flowchart illustrating a screen guide method of a turn-by-turn navigation system according to an embodiment of the present invention.

Referring to FIG. 4, a screen guide method includes a destination setting step S41, a path generating step S42, a current guidance generating step S43, a next guidance generating step S44, a next guidance urgency determining step S45, an image generating step S46, a converting step S47 for converting a next guidance into a current guidance, and a determining step S48 for determining if the car reaches the destination.

The screen guide method composed of the above-described steps will be described more in detail with reference to FIGS. 3 and 4.

In Step S41, the driver (or other user) inputs the destination in the navigation system using a keypad, a touch screen or his/her voice.

In Step S42, when the driver sets the destination and requests the road guide, a current location is first determined. That is, referring to FIG. 3, the positioning module 31 receives the information from the satellite, calculates the current location, and keeps reporting on the current road where the car is located. At this point, the positioning module 31 may be designed to receive the position information from a global position system (GPS). Then, the route planning/route guidance module 33 generates the path based on such position information.

In Step S43, the current guidance is generated. That is, guide content appropriate for the current position is generated using the information generated in the route planning/route guidance module 33. For example, if the current position is in a section where the car should go straight, a straight guide is generated. However, when it is the straight guide, it is preferable that a guide such as "after a predetermined M" is omitted so as to avoid confusion.

In Step S44, a next guidance is generated. That is, when the route planning/route guidance module 33 imaginarily follows a predetermined path and a different type of driving should be realized after the car advances by a predetermined distance, the route planning/route guidance module 33 forms such a guide as the next guidance. Such a next guidance is performed at an intersection, an approaching road to a high level road, or an approaching road to the underground.

In Step S45, an extent of urgency for the next guidance is determined. That is, the route planning/route guidance module 33 generates information on how quickly the driver should cope with the next guidance after the car drives in response to the current guidance. The extent of the urgency generated by the route planning/route guidance module 33 can be divided into a plurality of steps.

For example, although not limiting the present invention, the extent of the urgency can be divided into three steps. After the current guidance is completed, when the distance and time for coping with the next guidance is sufficient, the extent of the urgency is represented as green light. After the current guidance is completed, when the distance and time for coping with the next guidance is sufficient but in an extent where the driver should recognize the next guidance, the extent of the urgency is represented as yellow light. After the current guidance is completed, when the next guidance should be urgently performed, the extent of the urgency is represented as red light.

Figure 5:
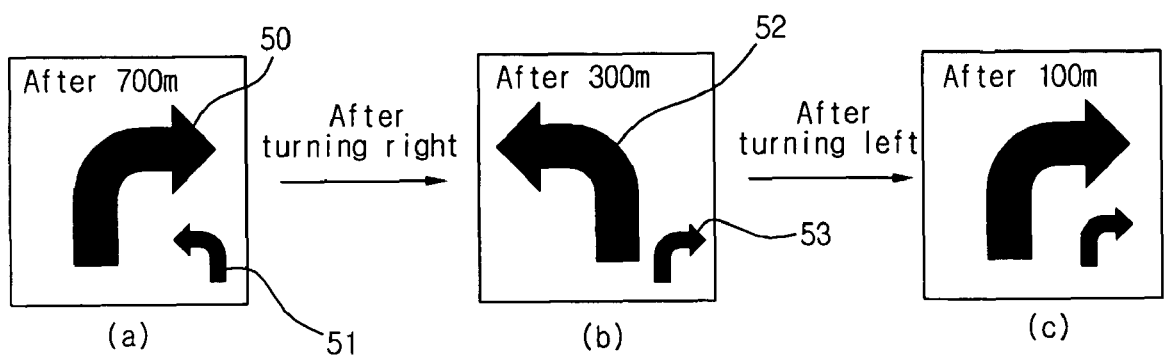
FIGS. 5*a* through 5*c* are views illustrating a screen example of a turn-by-turn navigation system according to the present invention.

In Step S46, a guide image is generated. That is, the turn-by-turn graphic user interface 34 generates and outputs an image formed according to the current guidance content. Then, the next guidance is added to the image and the extent of the urgency is displayed as a color determined in Step S3. At this point, since the next guidance may be confused with the current guidance, the next guidance is formed in a relatively small icon 51. FIG. 5 shows an example of this formation. This will be described in more detail later.

In Step S47, the next guidance is converted into the current guidance. That is, after the driver drives the car according to the current guidance, the current guidance is replaced with the next guidance.

In Step S48, it is determined if the car arrives at the destination. When the car arrives at the destination, the guide is finished. When the car does not reach the destination, the guide process is returned to Step S44.

FIGS. 5*a* through 5*c* show a screen example provided by the turn-by-turn navigation according to the present invention.

As shown in the screen example, a current guidance icon 50 and a next guidance icon 51 are displayed on the screen.

That is, as shown in FIG. 5*a*, the screen displays the current guidance icon 50 representing that the car should make a right turn after advancing 700 M and the next guidance icon 51 representing left turn information that is the next guidance.

At this point, the next guidance icon 51 providing the left turn information that is the next guidance is displayed on a lower right corner, being smaller than the current guidance icon so as to avoid the confusion between the current guidance and the next guidance. In addition, as shown in FIG. 5*b*, since the location where the left turn according to the next guidance is made is 300 M from a point where the right turn according to the current guidance is made, the extent of the urgency is medium, being represented as the yellow light.

According to the above-described guide, when the driver advances the car by 700 M and then makes a right turn, the guide image is changed as shown in FIG. 5*b*. That is, the next guidance icon 51 disposed in FIG. 5*a* is displayed as a current guidance icon 52 with the remained distance information. The right turn signal that is a next guidance is displayed as a new next guidance icon 53 on a lower right corner.

At this point, as shown in FIG. 5*c*, since the location where the right turn according to the next guidance is made is 100 M from a point where the right turn is made, the extent of the urgency is represented as the red light.

Meanwhile, the guidance signals include a go-straight signal, a left turn signal, a right turn signal, a U-turn signal, a P-turn signal, a high level road approaching signal, a high level road evading signal, an underground approaching signal, an underground evading signal, and a destination arrival signal. However, the guidance signals are not limited this case. If required, other signals can be added or some of the signals can be omitted.

According to the present invention described above, although the turn-by-turn navigation system is designed not to display full map at a glance, it can allow the driver to quickly cope with the next advancing path. Accordingly, the navigation system disallows the driver to frequently change and provides the safety drive to the driver.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A turn-by-turn navigation system, comprising:
   a positioning unit configured to recognize position information and update real time information related to a road on which a vehicle is currently located based on information received from a satellite;
   a map unit configured to store information related to a navigation route between a current vehicle position and an identified destination;
   a guidance unit configured to process the real time information related to the road and the information related to the navigation route and generate current guidance information and next guidance information;
   a graphic unit configured to process the current guidance information and next guidance information and generate a current guidance image and a next guidance image, the current guidance image based on the current vehicle position and indicating a current direction of travel and a direction of a next maneuver and the next guidance image based on a projected vehicle position after the next maneuver is performed and indicating a next direction of travel and a direction of a second-to-next maneuver, wherein a size of the next guidance image is different from a size of the current guidance image; and
   a display unit configured to concurrently display the current guidance image and next guidance image, the current guidance image concurrently displayed with an approximate distance indicating how far the current vehicle position is from a position of the next maneuver and the next guidance image indicating how far the projected vehicle position after completion of the next maneuver is from a position of the second-to-next maneuver,
   wherein the display unit is further configured to display urgency for performing a direction change according to the next guidance image after performing a direction change according to the current guidance image, the urgency indicated by a color of the next guidance image displayed, wherein the color is assigned to the next guidance image from a plurality of colors according to a level of the urgency, each level of the urgency corresponding to one of the plurality of colors, and
   wherein the level of the urgency is determined based upon a distance between the projected vehicle position after completion of the next maneuver and the position of the second-to-next maneuver.

2. The turn-by-turn navigation system according to claim 1, wherein the positioning unit is further configured to obtain the position information from a global positioning system.

3. The turn-by-turn navigation system according to claim 1, wherein the display unit is further configured to display the current guidance image indicating the direction of the next maneuver as larger than the next guidance image indicating the direction of the second-to-next maneuver.

4. The turn-by-turn navigation system according to claim 1, wherein the graphic unit is further configured to generate each of the current guidance image and the next guidance image comprising one of an indication to go straight, a left turn indication, a right turn indication, a U-turn indication, or a P-turn indication.

5. The turn-by-turn navigation system according to claim 1, wherein the display unit is further configured to display a high level road approaching signal or a high level road evading signal.

6. The turn-by-turn navigation system according to claim 1, wherein the display unit is further configured to display an underground approaching signal or an underground evading signal.

7. A method for guiding a next direction using a turn-by-turn navigation system, the method comprising:
   recognizing a destination;
   receiving information from a satellite;
   identifying a current vehicle position and generating a navigation route to the destination based on the information;
   generating a current guidance image and a next guidance image;
   concurrently displaying the current guidance image and next guidance image, the current guidance image based on the current vehicle position and indicating a current direction of travel and a direction of a next maneuver and the next guidance image based on a projected vehicle position after the next maneuver is performed and indicating a next direction of travel and a direction of a second-to-next maneuver, the next guidance image further indicating how far the projected vehicle position after completion of the next maneuver is from a position of the second-to-next maneuver, wherein a size of the next guidance image is different from a size of the current guidance image;
   displaying an approximate distance indicating how far the current vehicle position is from a position of the next maneuver; and
   displaying urgency for performing a direction change according to the next guidance image after performing a direction change according to the current guidance image,
   wherein the urgency is indicated by a color of the next guidance image displayed, the color being assigned to the next guidance image from a plurality of colors according to a level of the urgency and each level of the urgency corresponding to one of the plurality of colors, and wherein the level of the urgency is determined based upon a distance between the projected vehicle position after completion of the next maneuver and the position of the second-to-next maneuver.

8. The method according to claim 7, wherein recognizing the destination comprises processing an input received via one of a keypad, a touch screen, or a voice.

9. The method according to claim 7, further comprising obtaining the current vehicle position from a global positioning system.

10. The method according to claim 7, further comprising displaying the current guidance image indicating the direction of the next maneuver as larger than the next guidance image indicating the direction of the second-to-next maneuver.

11. The method according to claim 7, wherein each of the current guidance image and the next guidance image comprises one of an indication to go straight, a left turn indication, a right turn indication, a U-turn indication or a P-turn indication.

12. The method according to claim 7, further comprising displaying a high level road approaching signal or a high level road evading signal.

13. The method according to claim 7, further comprising displaying an underground approaching signal or an underground evading signal.

14. The method according to claim 7, further comprising displaying the next guidance image using a different color than a color used for the current guidance image.

15. The method according to claim 14, further comprising displaying the next guidance image as one of green, red or yellow.

16. The method according to claim 10, further comprising displaying road information.

17. The method according to claim 16, further comprising displaying the name of a street related to the next maneuver.

18. The method according to claim 14, further comprising displaying road information.

19. The method according to claim 18, further comprising displaying the name of a street related to the next maneuver.

20. The method according to claim 7, further comprising generating the current guidance image based on the current vehicle position and the navigation route and generating the next guidance image based on the projected vehicle position after the next maneuver is performed and the navigation route.

21. The method according to claim 1, wherein the display unit is further configured to display the next guidance image using a different color than a color used for the current guidance image.

22. The method according to claim 21, wherein the display unit is further configured to display the next guidance image as one of green, red or yellow.

23. The method according to claim 10, wherein the display unit is further configured to display road information.

24. The method according to claim 23, wherein the display unit is further configured to display the name of a street related to the next maneuver.

25. The method according to claim 21, wherein the display unit is further configured to display road information.

26. The method according to claim 25, wherein the display unit is further configured to display the name of a street related to the next maneuver.

27. The method according to claim 1, wherein the graphic unit is further configured to generate the current guidance image based on the current vehicle position and the navigation route and generate the next guidance image based on the projected vehicle position after the next maneuver is performed and the navigation route.

28. A method for guiding a next direction using a turn-by-turn navigation system, the method comprising:
receiving information from a satellite;
generating a current guidance image and a next guidance image based on the information;
concurrently displaying the current guidance image and next guidance image, the current guidance image indicating a current direction of travel and a direction of a next maneuver, and the next guidance image indicating a next direction of travel and a direction of a second-to-next maneuver after the next maneuver is performed, the next guidance image further indicating how far a projected vehicle position after completion of the next maneuver is from a position of the second-to-next maneuver, wherein a size of the next guidance image is different from a size of the current guidance image;
displaying an approximate distance indicating how far a current vehicle position is from a position of the next maneuver; and
displaying urgency for performing a direction change according to the next guidance image after performing a direction change according to the current guidance image,
wherein the urgency is indicated by a color of the next guidance image displayed, the color being assigned to the next guidance image from a plurality of colors according to a level of the urgency and each level of the urgency corresponding to one of the plurality of colors, and wherein the level of the urgency is determined based upon how far the current vehicle position is from the position of the next maneuver and how far the current vehicle position is from the position of the second-to-next maneuver.

29. The method according to claim 28, wherein the current guidance image is based on the current vehicle position and the next guidance image is based on the projected vehicle position after completion of the next maneuver.

30. A turn-by-turn navigation system receiving information required for navigation from a satellite, the turn-by-turn navigation system comprising:
a graphic unit configured to generate a current guidance image and a next guidance image, wherein the current guidance image is based on a current vehicle position and indicates a current direction of travel and a direction of a next maneuver, the next guidance image is based on a projected vehicle position after the next maneuver is performed and indicates a next direction of travel and a direction of a second-to-next maneuver, and a size of the next guidance image is different from a size of the current guidance image; and
a display unit configured to concurrently display the current guidance image and next guidance image, the current guidance image concurrently displayed with an approximate distance indicating how far the current vehicle position is from a position of the next maneuver and the next guidance image indicating how far the projected vehicle position after completion of the next maneuver is from a position of the second-to-next maneuver,
wherein the display unit is further configured to display urgency for performing a direction change according to the next guidance image after performing a direction change according to the current guidance image, the urgency indicated by a color of the next guidance image displayed, wherein the color is assigned to the next guidance image from a plurality of colors according to a level of the urgency, each level of the urgency corresponding to one of the plurality of colors, and wherein the level of the urgency is determined based upon how far the current vehicle position is from the position of the next maneuver and how far the projected vehicle position after completion of the next maneuver is from the position of the second-to-next maneuver.

31. The turn-by-turn navigation system according to claim 1, wherein the next guidance information is converted into a new current guidance information after the next maneuver is performed, replacing the current guidance information with the next guidance information.

32. The method according to claim 7, wherein the next guidance image is converted into a new current guidance image after the next maneuver is performed, replacing the current guidance image with the next guidance image.

33. The method according to claim 28, wherein the next guidance image is converted into a new current guidance image after the next maneuver is performed, replacing the current guidance image with the next guidance image.

34. A turn-by-turn navigation system, comprising:
a positioning module receiving position information from a satellite and updating real time road information on a road on which a vehicle is currently located based on the information;
a map database storing map information required for driving the vehicle;
a route planning/route guidance module receiving the real time road information and the map information and generating current guidance information and next guidance information;
a turn-by-turn graphic user interface module receiving the current and next guidance information and generating a current guidance image indicating current turn information and a next guidance image indicating next turn information, wherein a size of the next guidance image is different from a size of the current guidance image; and
an image display unit displaying the current and next guidance images, and urgency for performing a direction change according to the next guidance image after performing a direction change according to the current guidance image,
wherein the urgency is indicated by a color of the next guidance image displayed, the color being assigned to the next guidance image from a plurality of colors according to a level of the urgency and each level of the urgency corresponding to one of the plurality of colors, and wherein the level of the urgency is determined based upon a distance between a position where the direction change is performed according to the next guidance image and a position where the direction change is performed according to the current guidance image.

35. The system according to claim 34, wherein the next guidance image and the current guidance image are displayed in one image.

36. A method for guiding a next direction using a turn-by-turn navigation system, the method comprising:
inputting a destination;
receiving information from satellite;
identifying a current vehicle position and generating a path to the input destination based on the information;
generating a current guidance image based on the current vehicle position and a next guidance image;
displaying the current guidance image indicating current turn information and next guidance image indicating next turn information, wherein a size of the next guidance image is different from a size of the current guidance image; and
displaying urgency for performing a direction change according to the next guidance image after performing a direction change according to the current guidance image,
wherein the urgency is indicated by a color of the next guidance image displayed, the color being assigned to the next guidance image from a plurality of colors according to a level of the urgency and each level of the urgency corresponding to one of the plurality of colors, and wherein the level of the urgency is determined based upon a distance between a position where the direction change is performed according to the next guidance image and a position where the direction change is performed according to the current guidance image.

37. The method according to claim 36, wherein the next guidance image and the current guidance image are displayed in one image.

38. A turn-by-turn navigation system, comprising:
a positioning unit configured to recognize position information and update real time information related to a road on which a vehicle is currently located based on information received from a satellite;
a map unit configured to store information related to a navigation route between a current vehicle position and an identified destination;
a guidance unit configured to process the real time information related to the road and the information related to the navigation route and generate current guidance information and next guidance information;
a graphic unit configured to process the current guidance information and next guidance information and generate a current guidance image and a next guidance image, the current guidance image based on the current vehicle position and indicating a current direction of travel and a direction of a next maneuver and the next guidance image based on a projected vehicle position after the next maneuver is performed and indicating a next direction of travel and a direction of a second-to-next maneuver, the next guidance image further indicating how far the projected vehicle position after completion of the next maneuver is from a position of the second-to-next maneuver; and
a display unit configured to concurrently display the current guidance image and next guidance image, the current guidance image concurrently displayed with an approximate distance indicating how far the current vehicle position is from a position of the next maneuver, wherein a size of the next guidance image is different from a size of the current guidance image, and wherein the next guidance image is converted into a new current guidance image after the next maneuver is performed, replacing the current guidance image with the next guidance image,
wherein the display unit is further configured to display urgency for performing a direction change according to the next guidance image after performing a direction change according to the current guidance image, the urgency indicated by a color of the next guidance image displayed, wherein the color is assigned to the next guidance image from a plurality of colors according to a level of the urgency, each level of the urgency corresponding to one of the plurality of colors, and wherein the level of the urgency is determined based upon a distance between the projected vehicle position after the next maneuver and the position of the second-to-next maneuver.

39. A method for guiding a next direction using a turn-by-turn navigation system, the method comprising:
  recognizing a destination;
  receiving information from a satellite;
  identifying a current vehicle position and generating a navigation route to the destination based on the information;
  generating a current guidance image and a next guidance image, wherein a size of the next guidance image is different from a size of the current guidance image;
  concurrently displaying the current guidance image and next guidance image, the current guidance image based on the current vehicle position and indicating a current direction of travel and a direction of a next maneuver and the next guidance image based on a projected vehicle position after the next maneuver is performed and indicating a next direction of travel and a direction of a second-to-next maneuver;
  displaying how far the current vehicle position is from a position of the next maneuver and how far the current vehicle position is from a position of the second-to-next maneuver, wherein the next guidance image is converted into a new current guidance image after the next maneuver is performed, replacing the current guidance image with the next guidance image; and
  displaying urgency for performing a direction change according to the next guidance image after performing a direction change according to the current guidance image,
  wherein the urgency is indicated by a color of the next guidance image displayed, the color being assigned to the next guidance image from a plurality of colors according to a level of the urgency and each level of the urgency corresponding to one of the plurality of colors, and wherein the level of the urgency is determined based upon a distance between the projected vehicle position after completion of the next maneuver and the position of the second-to-next maneuver.

* * * * *